A. A. PINDSTOFTE.
BOTTLING MACHINE.
APPLICATION FILED OCT. 31, 1910.
1,018,988.
Patented Feb. 27, 1912.
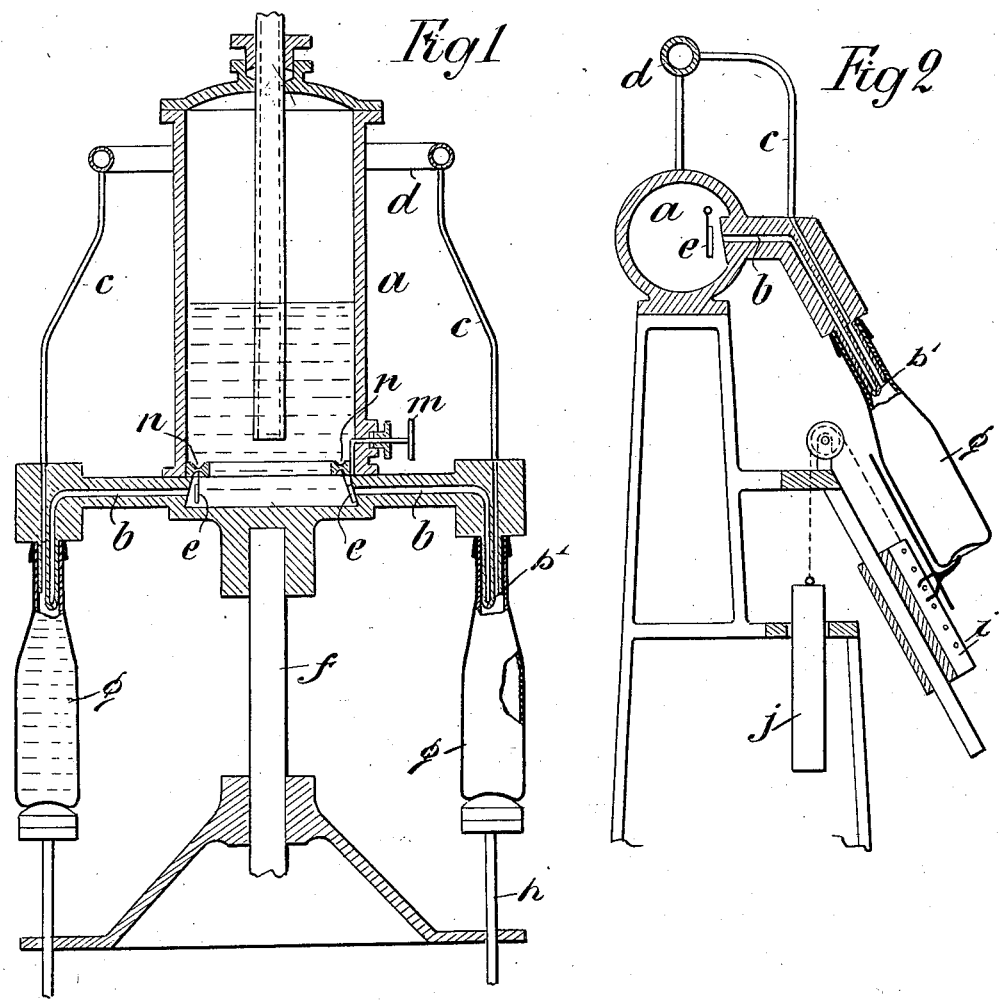
Witnesses
Inventor though the pressure is greater in the bottle.

UNITED STATES PATENT OFFICE.

ANDERS ANDERSEN PINDSTOFTE, OF COPENHAGEN, DENMARK.

BOTTLING-MACHINE.

1,018,988.   Specification of Letters Patent.   Patented Feb. 27, 1912.

Application filed October 31, 1910. Serial No. 590,008.

*To all whom it may concern:*

Be it known that I, ANDERS ANDERSEN PINDSTOFTE, manufacturer, a citizen of the Kingdom of Denmark, residing at No. 62 Frederiksberg Allé, in the city of Copenhagen, Denmark, have invented certain new and useful Improvements in Bottling-Machines; and I do hereby declare the following to be a full, clear, and exact description of the invention, such as will enable others skilled in the art to which it appertains to make and use the same.

This invention relates to improvements in bottling machines, and has for its object to minimize the loss of liquid due to the bursting or breaking of bottles during the bottling process, and to automatically cut off the flow of liquid when filled bottles are moved away from the filling nozzles.

Another object is to so mount the controlling valves that they may simultaneously be moved away from their seats when the machine is to be cleaned.

While the invention is not limited to the exact details shown and described, still for the purpose of disclosure reference is had to the accompanying drawings illustrating means for carrying out the invention, in which drawings like letters designate the same parts in the several views, and in which—

Figure 1 is a view in vertical section through parts of a rotary bottling machine embodying the present invention, one of the bottles being shown as broken to illustrate the automatic operation of the controlling valve. Fig. 2 is a similar view through a stationary bottling machine, and Fig. 3 shows a fragmentary sectional view of modified details.

In carrying out the present invention I provide valves normally held in an open position when the pressure in the discharge end of the bottling pipes is equal to or greater than the liquid pressure in the filling tank, and which are automatically closed by the pressure of the liquid contents of the tank when the pressure in the discharge end of the bottling pipes is reduced, owing to the removal of the bottle being filled or owing to its being broken.

In the construction illustrated in Fig. 1, wherein a rotary bottling machine is provided, $a$ designates the liquid reservoir, $b$ bottling pipes leading therefrom and terminating in discharging nozzles $b'$, $c$ air pipes terminating adjacent said discharge ends or nozzles $b'$ and connected at their other ends to an air supply pipe $d$.

$e$ designates one of a plurality of clack valves, one being provided for the eduction orifice of each bottling pipe, and being so mounted, and its weight so proportioned or so counterbalanced, that it normally lies in the position shown at the left of Fig. 1.

In the construction shown in Fig. 1 these valves are movably suspended on the interior of the liquid reservoir $a$ by a movable support, such as a rotary or tilting ring $n$ operated by means of any suitable angle bar $m$ passing through the reservoir and provided with an operating handle, enabling all of the valves to be moved away from their seats at the eduction orifices of the bottling pipes when the bottling machine is to be cleaned. It is obvious that other suitable means may be employed for movably supporting said valves to shift them simultaneously.

In Fig. 1 $f$ designates the rotating means for said machine, $g$ the bottles to be filled, and $h$ the operating plungers for forcing the bottle into operative engagement with the filling means and withdrawing same therefrom, these features being obvious to those familiar with the art.

In the stationary form of filling means shown in Fig. 2, the construction, so far as the present invention is concerned, is substantially the same, the same parts being designated by the same letters as in Fig. 1. In this view the bottles $g$ are moved by the carriers $i$ operated by the counterbalancing weights $j$, all of well known construction.

In the construction shown in Fig. 3 the valves are arranged at right angles to the position previously described, and instead of being normally held open up by gravity are normally held in their open position by a counterbalancing weight $o$, when the liquid pressure is no greater than the counterpressure in the bottling pipe $b$.

In operation it will be observed that with the bottle $g$ in the position shown to the left in Fig. 1 and held in coöperative relation with the filling nozzle, when the pressure in the bottle from the air pipe $d$ is equal or greater than the liquid pressure in the reservoir $a$, the valve $e$ will be in its normal open position shown at the left in the figure, being held in said position by gravity when the pressures are equal on both sides, and when the pressure is greater in the bottle $g$ then by gravity plus the excess pressure. Should the bottle burst, however, the pressure at the discharge end of the pipe will be greatly reduced, and this, together with the tendency to increased velocity in the flow of the liquid, will cause the greater liquid pressure in the reservoir $a$ to immediately close the valve $e$ against its seat, as illustrated at the right in Fig. 1, the same operation following when the bottle is removed instead of being broken. It will also be observed that the various bottling pipes may be readily cleaned by moving the support $n$ so as to remove the valves $e$ from their seats, as described.

From the foregoing statement of operation the operation of the modified form will be apparent, and it will be seen from this invention that the waste of the liquid being bottled is minimized, and that also greater cleanliness is attained by preventing liquid from being ejected or spattered over apparatus and the bottling department whenever a bottle happens to break.

Having thus described the invention, what I claim is:—

1. In a bottling machine, the combination of a liquid-reservoir, bottling pipes leading from said reservoir, an air-reservoir, and air-pipes leading to said air reservoir, with clack valves or the like closing automatically said bottling pipes as soon as the outflow exceeds the normal, said valves being mounted upon a common support, and means for moving said support so much that the valves can be moved out from their operative position, when the machine shall be cleaned.

2. In a bottling machine, the combination of a liquid reservoir, bottling pipes leading from said reservoir, an air reservoir and air pipes leading to said air reservoir, with weighted or counter balanced clack valves or the like closing automatically said bottling pipes as soon as the outflow exceeds the normal and arranged in front of each of the inner orifices of said bottling pipes, said valves being mounted upon a common support, and means for moving said support so much that the valves can be removed from the orifice of the bottling pipes, when the machine shall be cleaned.

In testimony whereof, I have affixed my signature, in presence of two witnesses.

ANDERS ANDERSEN PINDSTOFTE.

Witnesses:
MARCUS DOÉLER,
CONSTANTIN EBERTH.